Aug. 2, 1960     C. R. BUSCH     2,947,384
RAILWAY CAR BRAKE MECHANISM

Filed Jan. 23, 1957     4 Sheets-Sheet 1

INVENTOR:
CHARLES R. BUSCH
BY
Morrison, Kennedy, Campbell
ATTORNEYS:

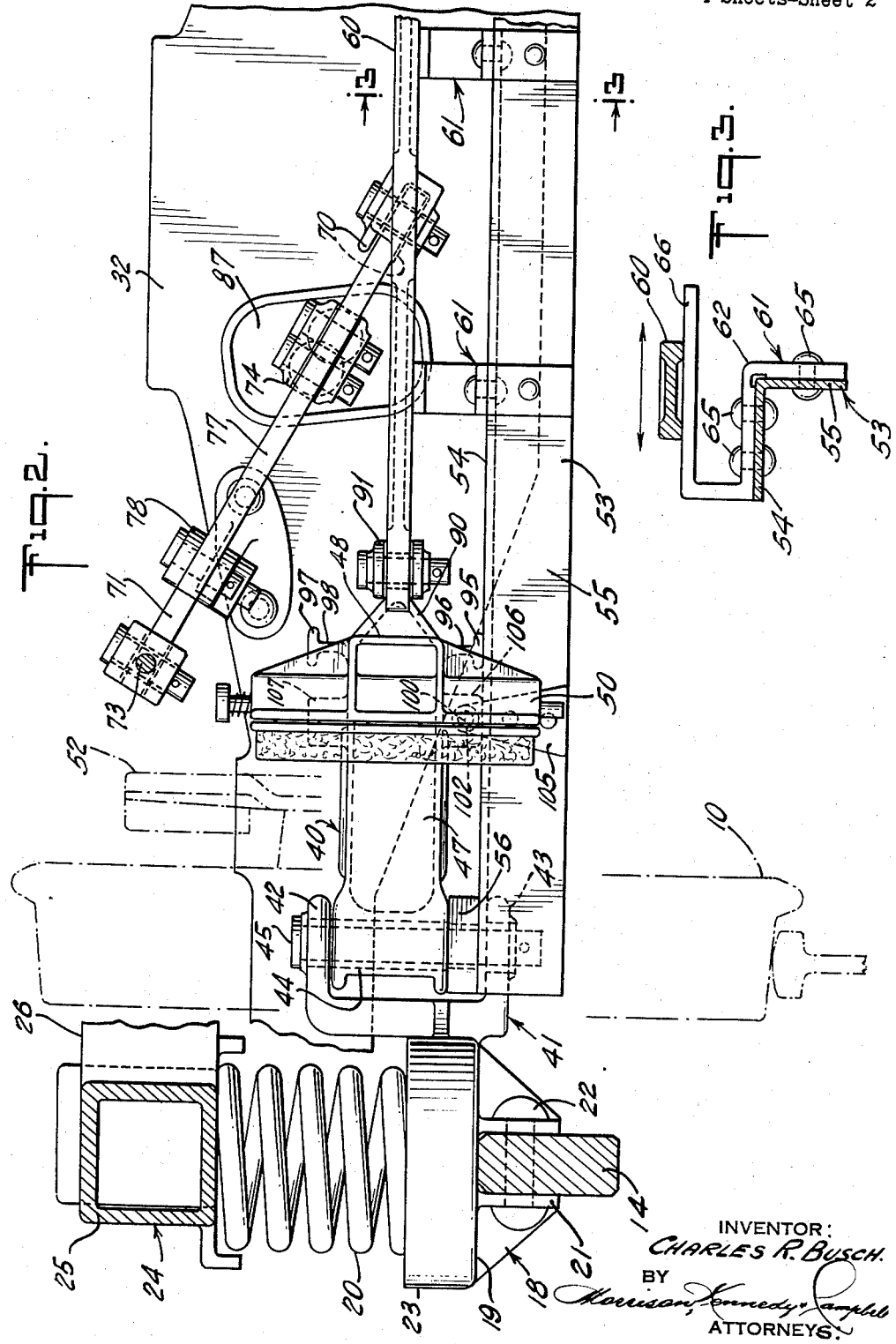

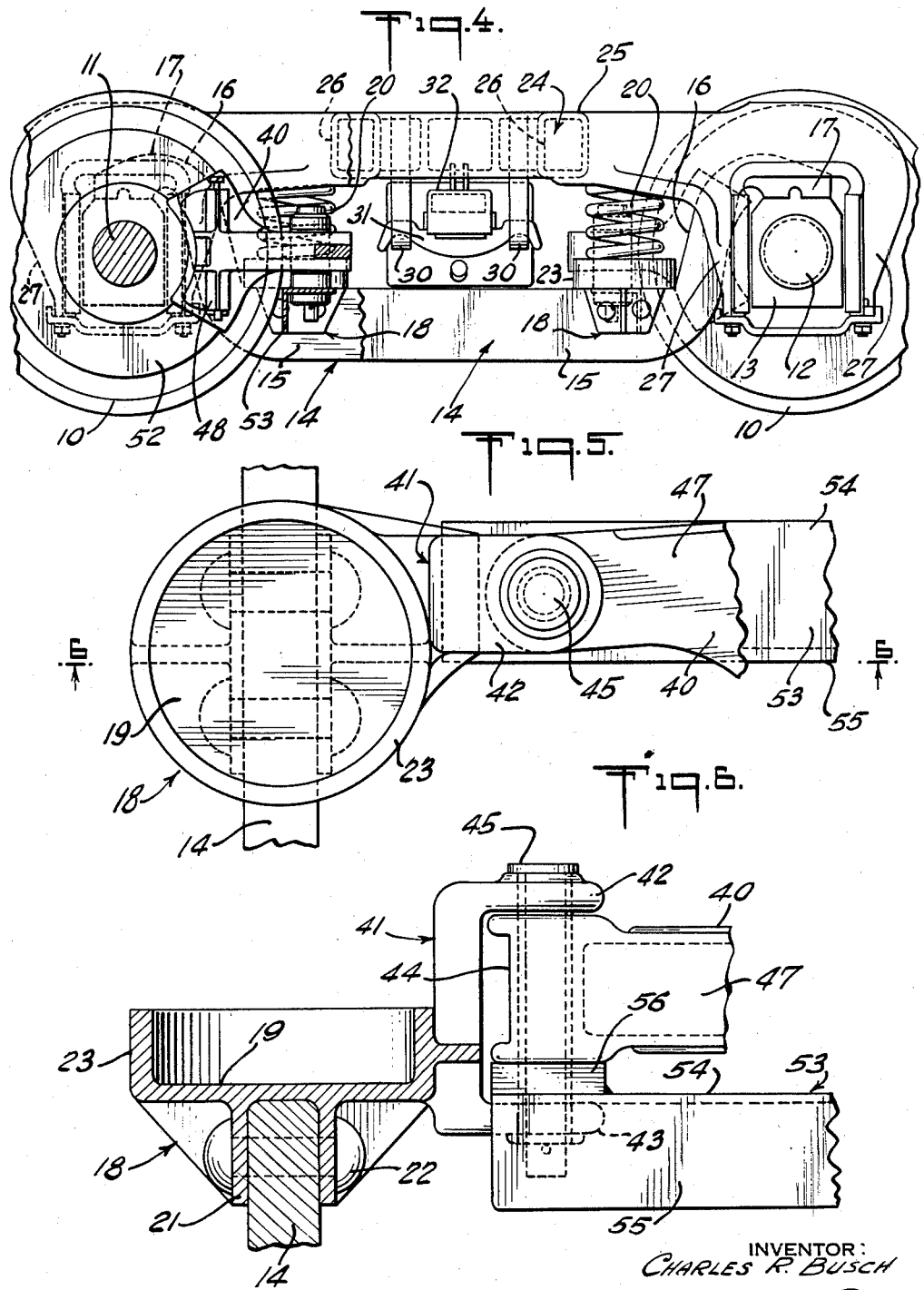

Aug. 2, 1960 — C. R. BUSCH — 2,947,384
RAILWAY CAR BRAKE MECHANISM
Filed Jan. 23, 1957 — 4 Sheets-Sheet 4
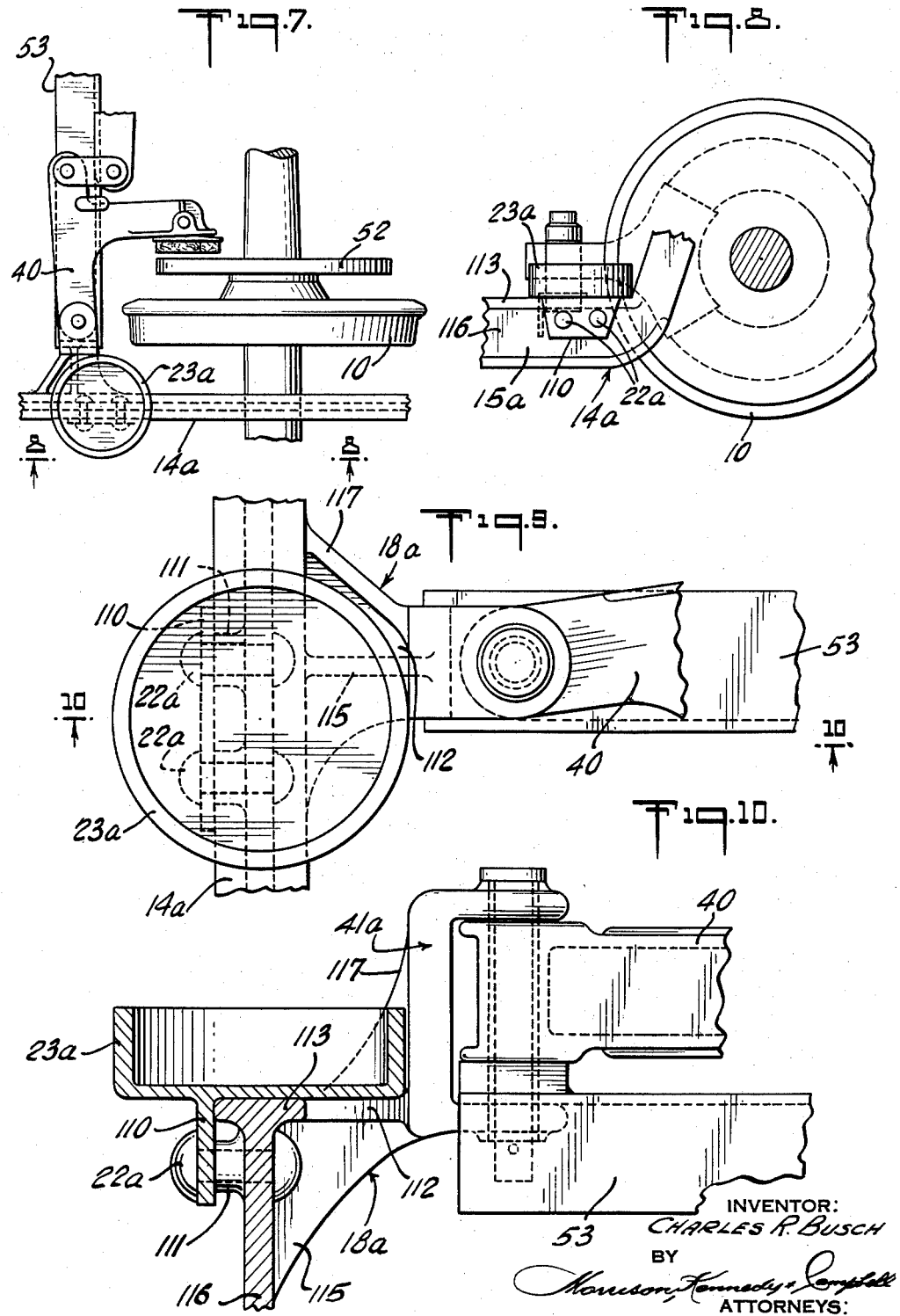
INVENTOR:
CHARLES R. BUSCH
BY
ATTORNEYS United States Patent Office 2,947,384
Patented Aug. 2, 1960

2,947,384

RAILWAY CAR BRAKE MECHANISM

Charles R. Busch, Orange, N.J., assignor to Buffalo Brake Beam Company, a corporation of New York Filed Jan. 23, 1957, Ser. No. 635,828

7 Claims. (Cl. 188—59)

The present invention relates to brake mechanisms for railway trucks of the type, in which longitudinal equalizer bars extend between spaced wheel and axle assemblies and mount springs for the truck frames, which in turn support the truck bolster.

In one type of railway truck structure of the character described, the brake mechanism comprises two brake beams on opposite sides of the truck bolster extending between and movably supported from the longitudinal equalizer bars, these brake beams having brake heads near their ends with metallic brake shoes for direct application to the peripheries of the wheels in braking position. The brake mechanism also comprises means for applying power to the brake beams along their center lines longitudinally of the truck to operate the beams towards the corresponding wheels for braking action.

The heat generated by the metallic brake shoes on the peripheral faces of the car wheels by the construction described, causes brake burns, burnt car wheel flanges, and outer rim cracks on the treads of the wheels and in many cases, is severe enough to cause the wheels to break and to cause thereby serious accidents.

Another disadvantage of the brake beam type of railway car brake device is that the brake shoe pressure on the wheels necessary for effective braking is so great, that it unseats the journal bearings from the journals, causing thereby hot boxes and resulting in delay and in damage to the equipment.

One object of the present invention is to provide a new and improved railway car brake device for a railway truck of the longitudinal equalizer bar type described, which overcomes the aforesaid and other disadvantages.

Another object of the invention is to provide a new and improved railway brake device for a railway truck of the longitudinal equalizer bar type described, which is designed to apply brake shoes for braking action against the faces of friction discs rotatable with respective wheels, thereby eliminating the use of heavy truss-like brake beams, which can be employed without material change in the basic construction of the truck, which assures uniform braking action on all four wheels of a railway truck regardless of unequal wear on the braking parts associated with the four wheels, and which is designed to afford interchangeability in the braking parts associated with the different wheels.

In accordance with one feature of the present invention, there are provided for each car truck four linkages, which simultaneously operate brakes against brake discs rotatable with respective car wheels and which are powered from a single source. These linkages are supported on the longitudinal equalizer bars, so that they are held against vertical movement relative to the wheel axles, thereby assuring constant brake pressure on the discs during brake application, even though the source of power may be connected to the body of the railway car for vertical movement therewith.

As an additional feature in connection with one embodiment of the invention, the seat members for the truck springs by which the truck frames and in turn the truck bolster are resiliently supported, have integral therewith pivot supports for brake head levers constituting parts of the aforesaid brake linkages.

As another feature in connection with another embodiment of the invention, the brackets which serve as pivot supports for the brake head levers constituting parts of the aforesaid brake linkages are integral with the longitudinal equalizer bars.

Various other objects, features and advantages of the invention are apparent from the following description and from the accompanying drawings, in which Fig. 1 is a top plan view somewhat diagrammatic showing the railway truck assembly with brake device constituting one embodiment of the present invention;

Fig. 2 is a transverse section of the railway truck assembly taken on lines 2—2 of Fig. 1 but shown on a larger scale;

Fig. 3 is a detail section of the railway truck assembly taken on lines 3—3 of Fig. 2;

Fig. 4 is a longitudinal section of the railway truck assembly taken on lines 4—4 of Fig. 1;

Fig. 5 is an enlargement of a detail of Fig. 1 in top plan view, showing a seat member for a truck spring with associated brake head lever;

Fig. 6 is a section of the detail shown in Fig. 5 taken on lines 6—6 of Fig. 5;

Fig. 7 is a top plan view of a detail of another embodiment of the present invention, showing a modified connection between the pivot support for the brake head lever, the seat for a truck spring and the longitudinal equalizer bar;

Fig. 8 is a front sectional elevation of the detail of Fig. 7 taken on lines 8—8 of Fig. 7;

Fig. 9 is an enlargement of a part of Fig. 7, in top plan view, showing a seat member for a truck spring with associated brake head lever; and Fig. 10 is a section of the detail of Fig. 9 taken on lines 10—10 of Fig. 9.

Figure 1:
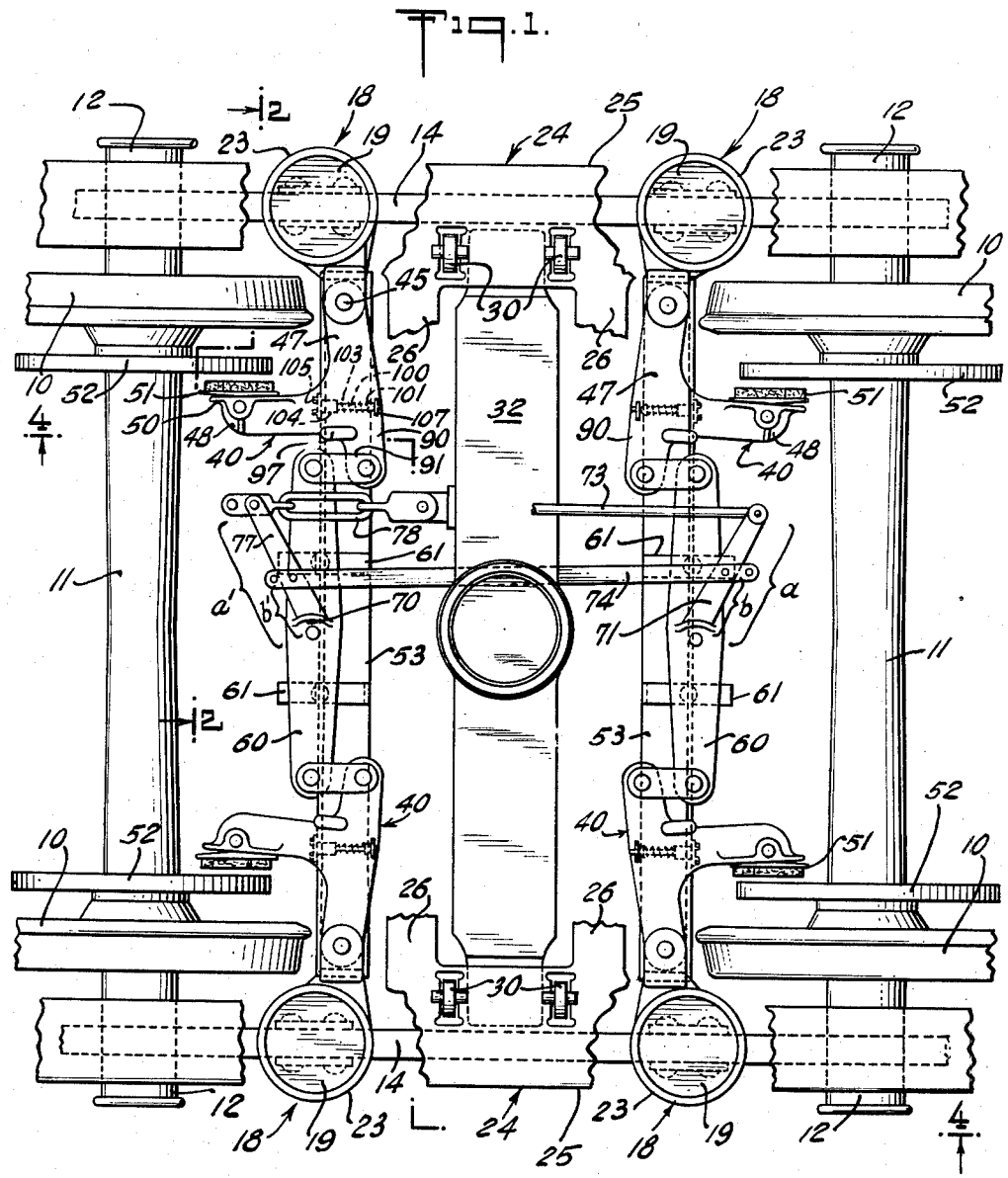

Referring to Figs. 1 to 6 of the drawings and especially to Figs. 1, 2 and 4, the brake mechanism of the present invention is shown applied to a railway truck having the usual four wheels 10 arranged to form two wheel and axle assemblies, each assembly comprising an axle 11 to which a pair of these wheels are coaxially connected near opposite ends. These axles 11 terminate in journals 12 mounting journal boxes 13. An equalizer bar 14 extending along the length of each side of the truck and hereinafter referred to as a longitudinal equalizer bar, extends between journal boxes 13 on the same side of the truck. This longitudinal equalizer bar 14 is substantially U-shaped and has a depressed middle section 15 and two upright sections or arms 16 at opposite ends, terminating in offsets 17 resting upon the journal boxes 13 respectively. Two spaced brackets 18 (Figs. 1, 2, 4, 5 and 6) having integral therewith respective seats 19 for two spring units 20 are connected and supported upon the middle section 15 of each longitudinal equalizer bar 14 near the ends thereof. Each bracket 18 has a channel 21 straddling the longitudinal equalizer bar 14 and rigidly connected thereto, as for example by rivets 22. Surmounting this channel 21 is a cup 23 adapted to receive and seat therein the lower end of the corresponding spring unit 20. Supported on the four spring units 20 on opposite sides of the truck is a structure 24 comprising side frames 25 and spaced transverse transoms 26 rigidly interconnecting said side frames. The side frame 25 on each side of the truck rests on the upper ends of the two spring units 20 on the same side of the truck and terminates at its ends in U-shaped depending arms 27 slidably straddling respective journal boxes 13 for vertical movement relative thereto.

For supporting the railway car on the truck, two swing hangers 30 (Figs. 1 and 4) are pivotally suspended from each side of the structure 24. Supported on each pair of these hangers 30 on each side of the structure 24 is a cross-bar 31. A truck bolster 32 extending across the truck between the transoms 26 has its ends supported upon the cross-bars 31. The railway car (not shown) is secured to the midsection of the truck bolster 32 by a swivel connection in the usual well-known manner, to permit relative angular movement between the bolster and the car about an upright axis.

The brakes for the four car wheels 10 of each car truck are operated by four similar brake head levers 40 (Figs. 1, 2, 4, 5 and 6) symmetrically arranged and actuated from a single source of power. These brake head levers 40 are pivotally supported from the brackets 18 respectively, which are rigid with the equalizer bars 14 as described. To provide a pivot connection between each bracket 18 and the corresponding brake head lever 40, each of these brackets 18 has on the inboard side of the spring cup 23 integral therewith, a yoke 41 defining a pair of vertical spaced projections 42 and 43 to receive therebetween the hub end 44 of the corresponding brake head lever 40, to form a knuckle joint therewith. A hinge pin 45 passes through the projections 42 and 43 and the hub 44 of the corresponding head lever 40.

Each brake head lever 40 is desirably L-shaped and has one leg 47 pivotally connected to the corresponding bracket 18 by the hinge pin 45 in the manner described, to permit said lever to move substantially horizontally about the axis of said hinge pin into and out of braking position and its other leg 48 carrying at its end a brake head 50. This brake head 50 carries a shoe 51 for the application to a brake rotor or disc 52 affixed to the corresponding car wheel 10 to stop said wheel and having for that purpose a brake face on its inboard side. The brake shoe 51 is mounted on the brake head 50 with a connection permitting limited pivotal movement of said shoe on said head and allowing thereby said brake shoe to adjust itself automatically into conforming surface contact with the brake disc 52 upon application of the brake.

The brake head levers 40 are supported and steadied in their horizontal movements into and out of horizontal position, to prevent the application of destructive stresses to different parts of the mechanism and especially to the hinge pin 45 and the braking forces tending to distort the longitudinal equalizer bars 14 inwardly out of parallelism and out of alignment with the wheel journals 12 are effectively resisted, while permitting limited relative endwise movements of the longitudinal equalizer bars, as the wheels round a curve. To that end, there are provided two transverse horizontal equalizer bars 53 (Figs. 1–6) on opposite sides of the truck bolster 32, each of these bars pivotally connecting with the two brackets 18 on the same side of the bolster to form a parallel motion device with the longitudinal equalizer bars 14. For securing each transverse equalizer bar 53 to the corresponding pair of brackets 18, the two hinge pins 45, which pivotally connect the corresponding two brake head levers 40 to the yokes 41 of said brackets on the said side of the truck bolster 32, also pass through the ends of the transverse equalizer bar. Each transverse equalizer bar 53 is in the form of an angle bar, one horizontal leg 54 of which is seated at each end upon the lower bracket yoke projection 43, and has a hole through which the hinge pin 45 passes, while the other leg 55 extends downward from said projection.

To afford a large bearing area between the transverse equalizer bar 53 at each end and the corresponding hinge pin 45, there is welded or otherwise affixed on the leg 54 of the equalizer bar at each end over the hole in said leg, a collar 56 (Figs. 2 and 6) located between said leg and the hub 44 on the corresponding brake head lever 40 and embracing the hinge pin with a snug rotative fit. The collar 56 serves not only to provide extra bearing surface for the transverse equalizer bar 53 but also serves to afford clearance for the support shoe 95 on the corresponding brake head lever 40, as will be more fully described.

Power is applied to the brake head levers 40 through a pair of similar bridle beams 60 (Figs. 1, 2 and 3) disposed on opposite sides of the truck bolster 32. These bridle beams 60 extend horizontally across the longitudinal center line of the car truck with the middle points of said beams on said center line. For supporting the bridle beams 60 and guiding them for horizontal movement along the center line of the truck, each of the transverse equalizer bars 53 has secured thereto two supports 61 spaced to seat thereon the corresponding bridle beam 60 at spaced regions thereof on opposite sides of its middle point. Each of these supports 61 comprises a lower angular mounting bracket 62 nested and seated against the two angular legs 54 and 55 of the transverse equalizer bar 53 and firmly secured thereto, as for example, by rivets 65 and an upper horizontal leg 66 on which the bridle beam 60 rests and along which said beam is guided horizontally in its slide movements in and out of brake applying position. The upper beam supporting legs 66 of the supports 61 could, if desired, have a certain amount of inherent resiliency to absorb some of the shocks transmitted to the bridle beam 60.

For applying power to the bridle beams 60, each of said bridle beams is integrally formed at its center region with a pair of pivot jaws or projections 70 extending obliquely upwardly and defining therebetween a socket to receive the lower end of an inclined lever. One of the bridle beams 60 receives the lower end of an inclined somewhat upright live lever 71 in the socket between its pivot jaws 70 and is pivotally connected thereto by a pin. The upper end of this live lever 71 is pivotally connected to a pull or power rod 73 operated from a lever (not shown) of the air cylinder (not shown), which is supported in the usual manner on the car body and which forms part of the conventional air brake equipment.

Power is transmitted from the bridle beam 60 to which the live lever 71 is conected to the other bridle beam 60 by means of a connecting rod 74 pivotally connected at one end to the intermediate section of the live lever 71 and pivotally connected at the other end to the intermediate section of an inclined somewhat upright dead lever 77. The lower end of this dead lever 77 extends into the socket between the jaws 70 of the corresponding bridle beam 60 and is pivotally connected thereto by a pin, and the upper end of this lever is anchored to the truck bolster 32 by a flexible coupling 78. The flexible nature of this coupling 78 permits the truck bolster 32 to move up and down, without distorting or bending the dead lever 77.

To assure that the braking forces applied to the four brake head levers 40 be equal, the ratio of the effective length $a$ (Fig. 1) of the live lever 71 to the length of its arm $b$ is the same as the ratio of the effective length $a'$ of the dead lever 77 to the length of its arm $b'$.

The connecting rod 74 passes through aligned openings 87 (Fig. 2) in the side walls of the bolster 32 near the center thereof, and each end of this rod is provided with two or more pivot holes at its ends to permit adjustments in the effective length of this rod to compensate for wear, tolerances or manufacturing variations in the brake mechanism. The flexible coupling 78 is similarly provided with a pair of pivot openings to afford adjustments in the effective length of said flexible coupling in accordance with changes made in the effective length of the connecting rod 74.

With the brake operating mechanism so far described, when the pull rod 73 is moved to the left (Fig. 1) as the result of the application of braking power, the bridle beam 60 to the right of the bolster 32 is moved to the right along its supporting guides 61 by the angular movement of the live lever 71 about its pivotal connection to the connecting rod 74. At the same time this connecting rod 74 is moved by this action endwise towards the left, thereby causing the bridle beam 60 to the left of the bolster 32 to be moved towards the left along its supporting guides 61 by the action of the dead lever 77 pivotally connected to said connecting rod and to the latter bridle beam.

The almost simultaneous operation of the two bridle beams 60 upon the application of the brake power through the pull rod 73 as described, is transmitted substantially simultaneously to the four brake head levers 40, to cause said levers to move about their pivotal supports 45 into braking position in relation to the brake discs 52. To effect the necessary connections between the bridle beams 60 and the brake head levers 40 for this purpose, each of the brake head levers has besides the two angularly related legs 47 and 48, a third stub leg 90 (Figs. 1 and 2) constituting an extension of the leg 47, this stub leg being preferably integral with the leg 47, although as far as certain aspects of the invention are concerned, said stub leg may be otherwise rigidly connected to the leg 47. The outer end of each lever leg 90 is connected to the adjacent outer end of the corresponding bridle beam 60 by means of a link 91, the ends of which are in the form of clevices straddling the outer end of said lever leg and the adjacent outer end of said bridle beam respectively, and are pivotally connected to said lever leg and said bridle beam respectively. By means of this construction, each bridle beam 60 on each side of the bolster 32 is linked at its ends to a pair of brake head levers 40 on the same side of the bolster, to actuate said levers simultaneously into brake applying position, as the bridle team moves laterally sideways away from the bolster 32 along the center line of the truck.

As already described, the transverse equalizer bars 53 as one of its functions, serve to support the weights of the brake head levers 40, thus relieving the hinge pins 45 from excessive stresses. To that end, each of the brake head levers 40 has a support shoe 95 (Fig. 2) at the bottom of the outer end of its leg 47 connected to the body of the brake head lever 40 by a flange 96 and seated on the top horizontal leg 54 of the corresponding transverse equalizer bar 53. These support shoes 95 are desirably cast integral with their corresponding brake head levers 40 through the flange connections 96 but may be welded, riveted, bolted or otherwise rigidly secured to said levers. The shoes 95 support the outer ends of the legs 47 of the corresponding brake head levers 40, and thereby prevent excessive bending stresses from being transmitted to the hinge pins 45. The shoes 95 on the brake head levers 40 maintain the levers in horizontal position, thereby steadying said levers against vibration during normal running operations, when the brakes are disengaged and also guiding the levers horizontally in their brake applying and releasing movements.

If each of the brake head levers 40 is provided with a single support shoe 95 at the bottom, then although the brake head lever aside from the shoe may be placed interchangeably from one position into either one of the other three positions, when the brake head lever is placed on the opposite side but on the same end of the bolster or at the opposite end on the same side of the bolster, it must be turned upside down, thereby causing a shoe which was on the bottom side of the brake head lever to be on the top side of the lever. Under these conditions, it would be necessary to provide a left hand brake head lever and a right hand brake head lever. To avoid this, and to make all of the four brake head levers 40 on each truck interchangeable, each of the brake head levers has two similar support shoes 95 and 97 (Figs. 1 and 2), one on the bottom and one on the top in vertical alignment, the upper one being connected to the body of the brake head lever through a flange 98 as in the case of the bottom shoe 95. With the construction described, the brake head lever 40 in any one of the four positions, will have a bottom support shoe in seating and supporting engagement with the corresponding transverse equalizer bars 53, even though all of the brake head levers 40 are of the same construction and design.

Positive spring releases are provided to move the brake head levers 40 out of braking positions upon the release of the braking power. Each of these releases comprises a plunger 100 (Figs. 1 and 2) in the form of a bolt having a head 101 at one end and threaded at the other end to receive a nut 102. Encircling the plunger 100 is a coil spring 103, one end of which bears against the plunger head 101, the other end of which fits into a cup 104 provided with an end abutment wall through which the plunger slidably extends. This cup 104 is rigidly secured by a bracket formation 105 to the corresponding equalizer bar 53.

The spring 103 in its expanding movement tends to move the plunger 100 towards the truck bolster 32 (Fig. 1), this movement being limited by the stop engagement of the nut 102 with the end wall of the cup 104. For transmitting the force of each spring 103 to the corresponding brake head lever 40, each of said brake head levers has depending from the bottom of its leg 47 on the side thereof nearest the truck bolster 32 a lug 106 engaging the plunger head 101 to serve as a tappet for the brake head lever 40.

With the construction described, upon application of the braking power through the pull or power rod 73, each of the brake head levers 40 is moved angularly about its pivot support 45 into position to apply its brake shoe 51 to the corresponding brake disc 52, while compressing the spring 103 of the corresponding spring device. Since the springs 103 are compressed during the application of the brakes, upon release of the braking power, the springs are also released, causing them to return into expanded condition. These expanding movements of the released springs 103 are transmitted to the brake head levers 40 through the plungers 100 and lugs 106, causing said brake head levers to be moved positively about their pivot supports 45 out of braking positions and away from the corresponding brake discs 52. The springs 103 are not strong enough to add substantially to the force required to apply effectively the brakes but are strong enough to move positively the brake head levers 40 out of braking position clear of the corresponding brake discs 52 upon the release of the braking power.

The expanding movements of the springs 103 upon the release of the brakes are continued until the nuts 102 on the plungers 100 come into engagement with the end walls of the spring retaining cups 104. These are the limits of releasing movements of the brake head levers 40, so that the spring devices described serve not only to move positively the brake head levers out of braking position upon release of braking power, thereby assuring that the brake shoes 51 do not remain in contact with the brake discs 52 upon release of the springs, but also serve to limit and predetermine the positions of the brake head levers 40 in brake released position.

Since the brake head levers 40 are intended to be interchangeable, so that they can operate on either side of the truck bolster 32 or at either end of the bolster, each of the brake head levers 40 is not only provided with a lower lug 106 but is also integrally provided with a similar upper lug 107 directly over the lower lug. The upper lug 107 is not active but comes into operation when the brake head lever 40 is disposed in position where this lug extends along the bottom. In this position, it cooperates with a spring release device as described to function, as already indicated.

In the construction of Figs. 1 to 6, the brake head levers 40 are pivotally supported on brackets 18 having formations defining the spring cups 23. In this embodiment of the invention, the longitudinal equalizer bars 14 are shown of forged construction with the middle sections 15 of rectangular oblong cross-section and the brackets 18 are shown with respective channels 21 beneath the cups 23 to receive the upper edges of said middle bar sections.

Figs. 7 to 10 show a modification of the invention, in which the longitudinal equalizer bars 14a corresponding to the longitudinal equalizer bars 14 in the construction of Figs. 1 to 6, are of cast construction and have their middle sections 15a of I cross-section. In this modification of Figs. 7 to 10, the spring cup 23a seats on the top edge of this middle bar section 15a and has a depending flange 110 secured to said bar section by means of rivets 22a. Collars 111 integral with the outboard side of the middle section 15a of the longitudinal equalizer bar 14a serve as ferrules for the rivets 22a and as spacers for the flange 110.

The brackets 18a for pivotally supporting the brake head levers 40 are not integral with the spring cup 23a, as in the embodiment of Figs. 1 to 6, but are cast integral with and directly to the longitudinal equalizer bar 14a and each has a T cross-section to define a top horizontal cross-flange 112 substantially in the form of an equilateral trapezoid forming an edgewise extension of the top flange 113 of the middle section 15a of the equalizer bar 14a and a substantial triangular vertical web 115 extending transversely of and integral with the web 116 of said middle section. At their inboard ends, the brackets 18a have integral therewith yokes 41a, similar to the yokes 41 in the construction of Figs. 1 to 6, for pivotally mounting the brake head levers 40 thereon. A substantially triangular rib 117 extending between the yoke 41a and the flange 113 and integral therewith adds reinforcement to the support of the yoke.

Except as described, the construction and operation of the brake mechanism employed in connection with the modifications of Figs. 7 to 10, are similar to those described for the construction of Figs. 1 to 6.

While the invention has been described with particular reference to specific embodiments, it is to be understood that it is not to be limited thereto, but is to be construed broadly and restricted solely by the scope of the appended claims.

What is claimed is:

1. In a railway car truck of the type comprising two spaced wheel and axle assemblies, each having two coaxial wheels and respective journals for said wheels mounting respective journal boxes, a substantially U-shaped longitudinal equalizer bar on each side of the truck extending between journal boxes on the same side of the truck and having a depressed middle section, springs supported on said depressed middle section of said equalizer bar, side frames supported on said springs for resilient movements up and down relative to the wheel journals, and a truck bolster extending between and supported on said frames, the combination comprising brake discs on the inboard sides of the wheels respectively and rigid with the wheels respectively for rotation therewith, said brake discs being provided with respective inboard brake faces, four L-shaped brake head levers arranged in two sets, one set consisting of a pair of levers in opposed relationship on opposite sides of the truck bolster pivotally supported from the depressed middle section of the longitudinal equalizer bar on one side of the truck on respective supports rigid with the latter middle section and on respective axes close to and fixed in relation to the latter middle section, the other set of levers consisting of a pair of levers in opposed relationship on the opposite sides of the bolster pivotally supported from the depressed middle section of the longitudinal equalizer bar on the other side of the truck on respective supports rigid with the latter middle section and on respective axes close to and fixed in relation to the latter middle section, each of said levers having one leg which extends along the bolster between the bolster and the corresponding brake disc with which it is adapted to coact and which is pivotally supported at one end of the lever to the corresponding longitudinal equalizer bar for substantially horizontal angular movement about the corresponding fixed axis, and having its other leg extending transversely away from the bolster towards the corresponding brake disc and carrying at its free end a brake head for cooperation with the latter brake disc, said levers in braking positions exerting forces mainly in inboard directions transverse to the equalizer bars on which said levers are supported, a pair of parallel transverse equalizer bars on opposite sides of the truck bolster extending along said bolster between the longitudinal equalizer bars and pivotally connected at their ends to supports rigid with said longitudinal equalizer bars and connected to the middle sections of the longitudinal equalizer bars for resisting said forces, all of said equalizer bars and said pivot supports being arranged in the form of a parallel motion device, each of said levers having a shoe on its underside spaced from its pivot support and resting on the transverse equalizer bar on the same side of the truck bolster to support said lever, and power means for operating said levers substantially simultaneously into brake applying positions.

2. In a railway car truck of the type comprising two spaced wheel and axle assemblies, each having two coaxial wheels and respective journals for said wheels mounting respective journal boxes, a substantially U-shaped longitudinal equalizer bar on each side of the truck extending between journal boxes on the same side of the truck and having a depressed middle section, springs supported on said depressed middle section of said equalizer bar, side frames supported on said springs for resilient movements up and down relative to the wheel journals, and a truck bolster extending between and supported on said frames, the combination comprising brake discs on the inboard sides of the wheels respectively and rigid with the wheels respectively for rotation therewith, said brake discs being provided with respective inboard brake faces, four L-shaped brake head levers arranged in two sets, one set consisting of a pair of levers in opposed relationship on opposite sides of the truck bolster pivotally supported from the depressed middle section of the longitudinal equalizer bar on one side of the truck on respective supports rigid with the latter middle section and on respective axes close to and fixed in relation to the latter middle section, the other set of levers consisting of a pair of levers in opposed relationship on opposite sides of the truck bolster pivotally supported from the depressed middle section of the longitudinal equalizer bar on the other side of the truck on supports rigid with the latter middle section and on respective axes close to and fixed in relation to the latter middle section, each of said levers having one leg which extends along the bolster between the bolster and the corresponding brake disc with which it is adapted to coact and which is pivotally supported at one end of the lever to the corresponding longitudinal equalizer bar for substantially horizontal angular movement about the corresponding fixed axis and having its other leg extending transversely away from the bolster towards the corresponding brake disc and carrying at its free end a brake head for cooperation with the latter brake disc, said levers in braking positions exerting forces mainly in inboard directions transverse to the equalizer bars on which said levers are supported, a pair of parallel transverse equalizer bars on opposite sides of the truck bolster extending along said bolster between the longitudinal equalizer bars and pivotally connected at their ends to supports rigid with said longitudinal equalizer bars and connected to the middle sections of the longitudinal equalizer bars for resisting said forces, all of said equalizer bars and said pivot supports being arranged in the form of a parallel motion device, each of said levers resting on the corresponding transverse equalizer bar at a region spaced a substantial distance from the corresponding pivot axis of the latter lever to support the latter lever, and power means for operating said levers substantially simultaneously into brake applying positions.

3. In a railway car truck of the type described in claim 2, the combination as described in claim 2, wherein each of said pivot supports for the brake head levers includes a spring seat in the form of a cup, the latter support being in the form of a yoke adapted to form a knuckle joint with one end of the corresponding brake head lever and having aligned holes in its arms to receive a hinge pin, the latter support including said cup and said yoke constituting a single integral unit.

4. In a railway car truck of the type described in claim 2, the combination as described in claim 2, wherein each of said pivot supports for the brake head levers includes a bracket, a spring seat and a pivot mounting and forms an integral unit separate from the corresponding longitudinal equalizer bar but rigidly connected thereto.

5. In a railway car truck of the type described in claim 2, the combination as described in claim 2, wherein there are provided seats for the springs and a pair of brackets separate from the spring seats and secured to the depressed middle section of each longitudinal equalizer bar near the opposite ends thereof respectively, said brackets having integral therewith said supports for said brake head levers respectively and for said transverse equalizer bars.

6. In a railway car truck of the type described in claim 2, the combination as described in claim 2, wherein the pivot supports for the corresponding brake head levers and the corresponding transverse equalizer bars are integral with the corresponding longitudinal equalizer bars.

7. In a railway car truck of the type described in claim 2, the combination as described in claim 2, wherein each of the depressed middle sections has a web and a top cross-flange, and the pivot support for each brake head lever comprises a yoke adapted to form a knuckle joint with one end of the corresponding brake head lever and integrally connected to the middle section of the corresponding longitudinal equalizer bar by connecting means including a T-bracket, the cross-flange of which forms an integral extension of the top cross-flange of the longitudinal equalizer bar, and the web of which extends transversely from and is integrally connected to the web of the middle section of the corresponding longitudinal equalizer bar.

References Cited in the file of this patent
UNITED STATES PATENTS

| | | |
|---|---|---|
| 840,991 | Coffman | Jan. 8, 1907 |
| 925,640 | Lamoreaux | June 22, 1909 |
| 972,899 | Morrison et al. | Oct. 18, 1910 |
| 1,620,508 | Ball | Mar. 8, 1927 |
| 2,365,460 | Eksergian et al. | Dec. 19, 1944 |
| 2,467,356 | Eksergian | Apr. 12, 1949 |
| 2,710,676 | McCormick | June 14, 1955 |